United States Patent [19]

Warner et al.

[11] 4,109,064
[45] Aug. 22, 1978

[54] BATTERY PACKS

[75] Inventors: Peter Stuart Warner, Henlow; John Richard Bicht, Hemel Hempstead, both of England

[73] Assignee: Lucas Industries Limited, Birmingham, England

[21] Appl. No.: 792,169

[22] Filed: Apr. 29, 1977

[30] Foreign Application Priority Data

May 8, 1976 [GB] United Kingdom ............... 19032/76

[51] Int. Cl.² .......................................... H01M 2/10
[52] U.S. Cl. ........................................ 429/66; 429/99
[58] Field of Search ................. 429/66, 99, 100, 159

[56] References Cited

U.S. PATENT DOCUMENTS

| 1,379,088 | 5/1921 | Edison | 429/66 |
| 2,461,752 | 2/1949 | McConnell | 429/99 |
| 2,812,376 | 11/1957 | Yardney | 429/66 |

*Primary Examiner*—Donald L. Walton
*Attorney, Agent, or Firm*—Ladas, Parry, Von Gehr, Goldsmith & Deschamps

[57] ABSTRACT

A battery pack comprising a plurality of batteries mounted in a structure with spring devices between them to exert a force in a direction transverse to the planes of plates of the batteries.

2 Claims, 3 Drawing Figures

BATTERY PACKS

This invention relates to battery packs, particularly for use in vehicles which are electrically driven by power derived from such a battery pack.

In such vehicles, it is important to ensure that the batteries, which make up the pack are held securely in place so as to prevent damage both to themselves and to surrounding structures and also to minimize stress in electrical connecting straps between the individual batteries. It is, however, not particularly desirable to secure the batteries rigidly in place. It is also known that batteries tend to swell in a direction transverse to the planes of their plates if not constrained against this tendency. If batteries are taken out of the packs it may be difficult to replace them if there has been such swelling in the meantime.

The object of this invention is to provide a battery pack in which the individual batteries are securely held in such a way as to meet these requirements.

According to the invention, a battery pack comprises a plurality of batteries mounted in a structure with spring devices mounted between the batteries and said structure to exert a force in a direction transverse to the planes of the plates of the respective batteries.

According to a further feature, the invention resides in a spring device for use in a battery pack as defined in the preceding paragraph and having at least one blade spring element carried on a base plate.

Figure 1:
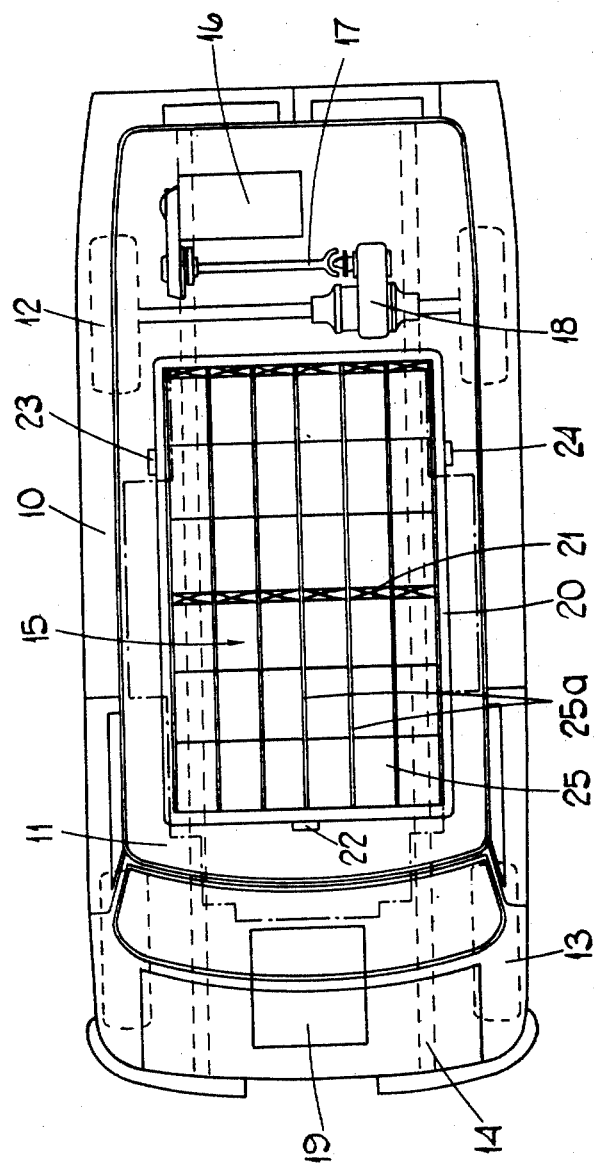
Figure 2:
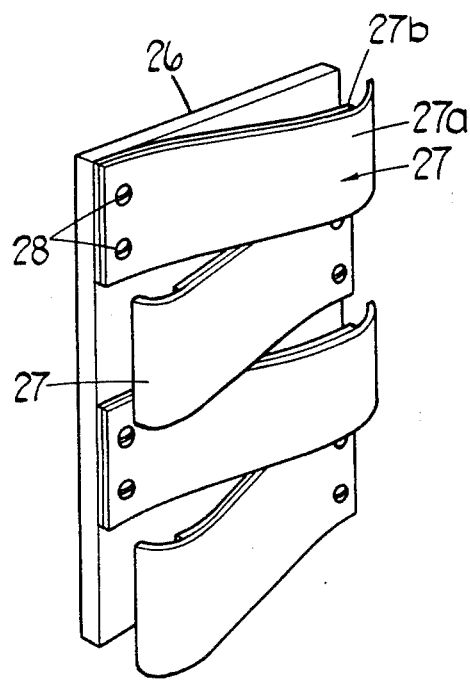
Figure 3:
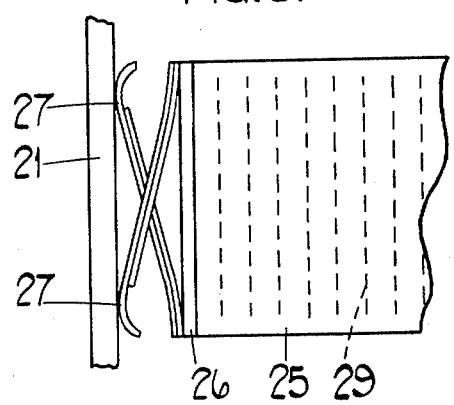

The invention will now be described, by way of example, with reference to the accompanying drawings, in which:

FIG. 1 is a plan view of an electrically driven vehicle incorporating a battery pack of the present invention, FIG. 2 is an enlarged perspective view of a spring device for use in the battery pack, and FIG. 3 is a fragmentary plan view of the spring device in a position of use.

FIG. 1 illustrates a light goods vehicle having an enclosed body 10, defining a goods carrying portion and at the front, a driver cab 11. The vehicle is of the kind originally designed for drive by means of an internal combustion engine with a gearbox, propeller shaft and differential transmission mechanism to the rear wheels 12 of the vehicle. The engine would occupy a space at the front of the vehicle adjacent to the front wheels 13 thereof.

The engine and such transmission have, however, been replaced by an electrical drive system.

To provide for driving the vehicle there is situated under the chassis 14 a battery pack 15 comprising a pannier in which are mounted a plurality of individual batteries. In this example, there are six rows each of six such batteries.

The power provided by the battery pack is used to drive an electric motor 16 which drives the rear wheels 12, through a transmission including a propeller shaft 17 and differential within a casing 18, all as described in U.S. patent application Ser. No. 792,276 filed Apr. 29, 1977.

At the front of the vehicle, within the space normally occupied by the internal combustion engine, is an electrical control unit 19, which is connected between driver controls (not illustrated) and the electric motor 16.

The battery pack pannier is indicated at 20. This is a hollow rectangular open topped box section structure with a transverse reinforcing wall 21 extending across the centre. The pannier is connected to the vehicle chassis in detachable manner by three fixing points 22, 23, 24 one of which is at the front of the pack, and the other two are at respective sides near the rear of the pack. There is a floor to the pannier on which the batteries 25 are carried.

Between the batteries and extending longitudinally of the rows are resilient packing pieces indicated at 25a. Furthermore, between the partition 21 and the rear walls of the adjacent six batteries are spring devices of the kind illustrated in FIGS. 2 and 3. Similarly, between the rear vehicle wall of the pannier 20 and the rear faces of the six batteries adjacent thereto are further spring devices.

One such spring device is shown in FIG. 2 and comprises a rectangular flat rigid base plate 26 carrying four curved blade springs 27, each rivetted to the base plate at one of its ends by rivets 28. Each spring comprises two plates 27a, 27b, one longer than the other and held together by the rivets 28. The longer one 27a, has its end extending beyond the plate 27b and has its end recurved. The two plates 27a, 27b are rivetted by the rivets 28 to the base plate 26 near one edge thereof.

The four blade springs 27 are alternately rivetted to opposite sides of the base plate 26 so that there are two extending away from the base plate in one direction and two in the other direction. All the springs 27 are, however, rivetted at one flat side face of the base plate. 26.

As shown in FIG. 3, the base plate 26 is positioned adjacent the rear face of one of the batteries 25 and the blade spring 27 rest against the adjacent front face of the partition 21, or of the rear wall of the pannier 20, as the case may be.

These spring devices provide a force sufficient to resist swelling of the batteries in a direction transverse to the plates 29 thereof, that is lengthwise of the vehicle. The order of force required for this is 1 pound per square inch. In the practical example illustrated, the force required to resist the swelling tendency of three batteries in line is 50 pounds.

The spring devices are made of stainless steel and when in position, occupy a space approximately 1½ inches deep, but as the batteries age, some swelling is inevitable and this clearance is reduced, but the devices hold the batteries securely in place at all times.

We claim:

1. A battery pack comprising a plurality of batteries, a structure in which the batteries are mounted, said structure including at least one wall generally parallel to planes of the plates of the batteries respectively, spring devices mounted between the batteries and said wall of the structure to exert a force in the direction transverse to the planes of the plates of the batteries, each spring device comprising a base plate and a number of blade spring elements mounted thereon, the blade spring elements being arranged in rows at opposite sides of the base plate alternately.

2. A battery pack as claimed in claim 1 in which each blade spring element comprises two spring members secured together and to the base plate at or near one end of said element.

* * * * *